United States Patent
Marx et al.

(10) Patent No.: US 6,783,169 B1
(45) Date of Patent: Aug. 31, 2004

(54) COVER ASSEMBLY FOR A VEHICLE BED

(75) Inventors: Craig T. Marx, Washington Township, MI (US); Thomas J. Apfel, II, Washington Township, MI (US); Nicanor P. Cantu, III, Rochester, MI (US); Thomas J. Mack, Highland, MI (US); Francois De Gaillard, Stockdorf (DE)

(73) Assignee: Webasto Sunroofs, Inc., Rochester Hills, MI (US)

( * ) Notice: Subject to any disclaimer, the term of this patent is extended or adjusted under 35 U.S.C. 154(b) by 0 days.

(21) Appl. No.: 10/365,549

(22) Filed: Feb. 13, 2003

(51) Int. Cl.[7] .......................... B60P 7/02; B62D 33/04
(52) U.S. Cl. ........................ 296/100.09; 296/100.03; 296/100.06; 296/136.03; 296/136.04
(58) Field of Search ................. 296/100.01, 100.02, 296/100.06, 100.09, 100.1, 136.03, 136.04; 280/770

(56) References Cited

U.S. PATENT DOCUMENTS

| | | | |
|---|---|---|---|
| 3,069,199 A | 12/1962 | Reardon et al. | 296/100.07 |
| 3,768,858 A * | 10/1973 | Boismier | 296/100.09 |
| 3,782,776 A * | 1/1974 | Ormont | 296/216.02 |
| 3,858,744 A | 1/1975 | Garvert | 217/30 G |
| 3,995,890 A * | 12/1976 | Fletcher | 296/10 |
| 4,531,775 A | 7/1985 | Beals | 296/100.06 |
| 4,695,087 A | 9/1987 | Hollrock | 296/14 |
| 4,848,830 A | 7/1989 | Parson | 296/165 |
| 4,997,227 A * | 3/1991 | Falzone et al. | 296/39.2 |
| 5,011,214 A * | 4/1991 | Friesen et al. | 296/100.09 |
| 5,110,021 A | 5/1992 | Dawson, Jr. | 224/405 |
| 6,095,587 A | 8/2000 | Shirlee et al. | 296/100.07 |
| 6,106,050 A | 8/2000 | McLeod | 296/100.06 |
| 6,224,140 B1 * | 5/2001 | Hoplock | 296/100.17 |
| 6,254,169 B1 | 7/2001 | Arthur | 296/100.07 |
| 6,309,005 B1 | 10/2001 | Priest et al. | 296/100.06 |
| 6,340,195 B1 | 1/2002 | Hall et al. | 296/100.07 |
| 6,435,594 B1 * | 8/2002 | Ekonen et al. | 296/100.09 |
| 6,598,930 B1 * | 7/2003 | Tilton | 296/100.06 |
| 2003/0047958 A1 * | 3/2003 | Yarbrough et al. | 296/100.06 |

FOREIGN PATENT DOCUMENTS

DE           35 29 524 A1 *  2/1987  ............. 296/100.1

* cited by examiner

Primary Examiner—D. Glenn Dayoan
Assistant Examiner—Paul Chenevert
(74) Attorney, Agent, or Firm—Pillsbury Winthrop LLP

(57) ABSTRACT

A cover assembly for a vehicle bed includes first and second cover members and a pair of cover mounts constructed to mount the cover members to the vehicle bed. The cover mounts enable the cover members to be moved between (a) a closed position wherein the cover members extend between the side walls of the vehicle bed to close the upwardly facing opening of the vehicle bed, (b) an open position wherein the cover members extend upwardly from the side walls to uncover the upwardly facing opening of the vehicle bed, and (c) a storage position wherein the cover members are retracted downwardly from the open position into the vehicle bed. At least one motor is operatively connected to the cover members to move the cover members at least between the closed and open positions thereof.

5 Claims, 15 Drawing Sheets

COVER ASSEMBLY FOR A VEHICLE BED

FIELD OF THE INVENTION

The present invention relates to a cover assembly for a vehicle bed.

BACKGROUND OF THE INVENTION

Cover assemblies for vehicle beds are well known in the art. For example, it is known to provide a cover assembly having one or more panels that are pivotally connected to one or more side walls of the vehicle bed for movement between open and closed positions. In the open position, the one or more panels extend generally vertically outwardly from the one or more side walls to allow access to the interior space of the vehicle bed. However, the one or more panels tend to inhibit the view of the driver if the driver is to drive the vehicle with the one or more panels in the open position.

The present invention provides improvements over known cover assemblies to improve driver visibility.

SUMMARY OF THE INVENTION

One aspect of the invention relates to a cover assembly that can be retracted into the vehicle bed to improve driver visibility. This aspect of the invention provides a cover assembly for a vehicle bed having at least a rear wall, opposing first and second side walls extending forwardly from the rear wall, and a floor. The rear wall, the side walls, and the floor define an interior space having an upwardly facing opening. The cover assembly includes first and second cover members and a pair of cover mounts constructed to mount the first and second cover members to the vehicle bed. The cover mounts enable the first and second cover members to be moved between (a) a closed position wherein the cover members extend between the side walls to close the upwardly facing opening of the vehicle bed and inhibit access to the interior space thereof, (b) an open position wherein the cover members extend upwardly from the side walls to uncover the upwardly facing opening of the vehicle bed and facilitate access to the interior space thereof, and (c) a storage position wherein the cover members are retracted downwardly from the open position into the vehicle bed. At least one motor is operatively connected to the first and second cover members and constructed to move the cover members at least between the closed and open positions thereof.

Other aspects, features and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
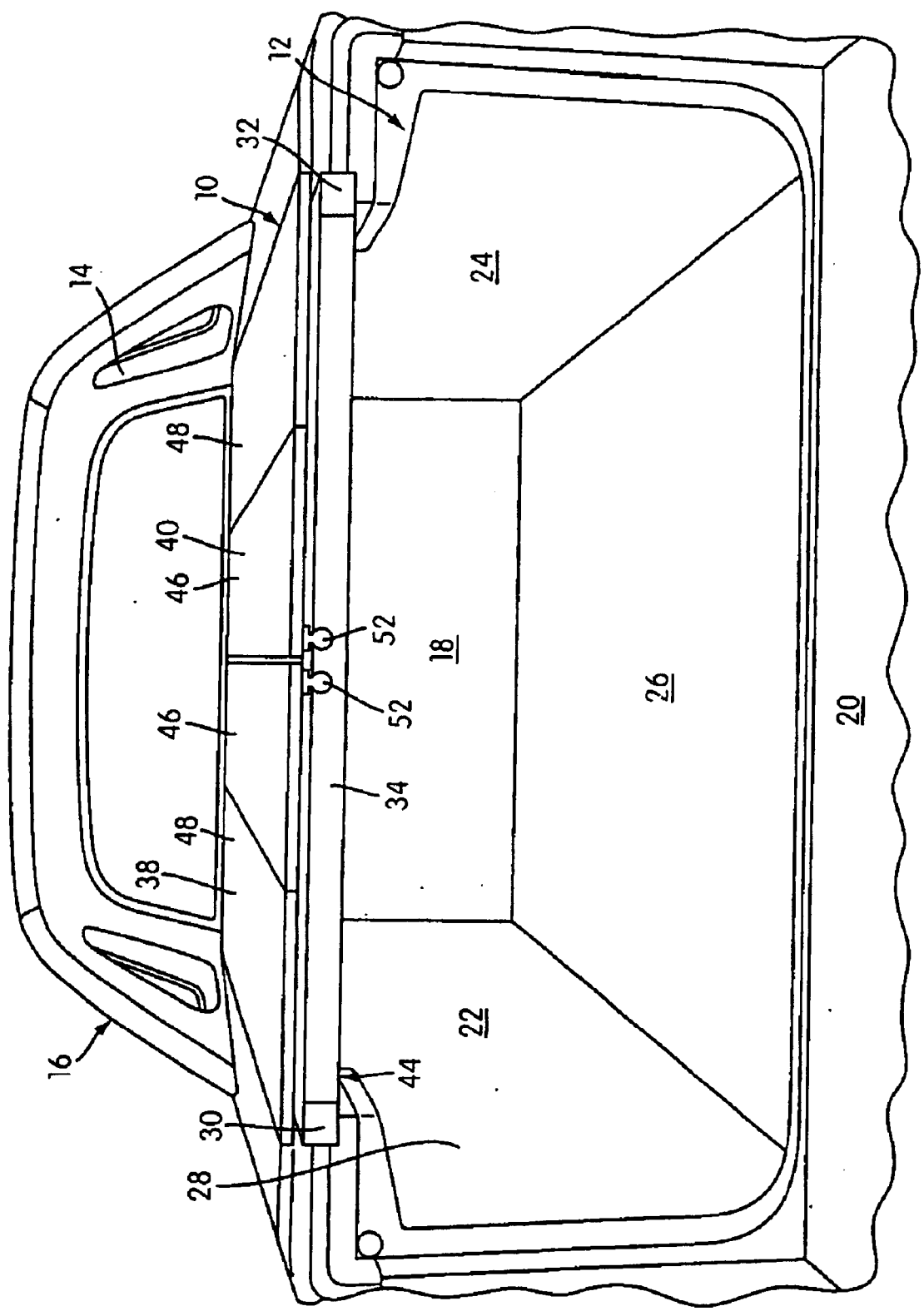
FIG. 1 is a rear perspective view illustrating a cover assembly constructed in accordance with an embodiment of the invention mounted to a vehicle bed, the cover assembly having cover members in a closed position and cover mounts in an extended position.

FIGS. 1–8 illustrate a cover assembly 10 constructed according to an embodiment of the present invention mounted to a vehicle bed 12. The vehicle bed 12 is mounted rearwardly of a vehicle cab 14 of a vehicle 16. As is conventional, a vehicle cab 14 is designed to accommodate passengers, including a driver, and has the various controls for operating the vehicle 16 (e.g., steering wheel, accelerator pedal, etc.). In the embodiment shown, the vehicle 16 is a pickup truck with the vehicle bed 12, or truck bed, having front and rear end walls 18, 20, first and second side walls 22, 24 extending perpendicularly between the front and rear end walls 18, 20, and a floor 26. The first and second side walls 22, 24, the front and rear end walls 18, 20, and the floor 26 define an interior space 28 having an upwardly facing opening for transporting objects. The rear end wall 20 may be a pivotally mounted tailgate for facilitating loading and unloading of the vehicle bed 12, or it may be fixedly secured in position. For example, FIGS. 1–4 illustrate the rear end wall 20 in an open position and FIGS. 5–8 illustrate the rear end wall 20 in a closed position. It is also contemplated that the front end wall 18 may be a rear wall of the vehicle cab 14. Further, the front end wall 18 may be movably mounted with respect to the floor 26.

As shown in FIGS. 1–4, the cover assembly 10 comprises a pair of cover mounts 30, 32, first and second transverse track members 34, 36, first and second cover members 38, 40, and a motor assembly 42.

The first and second cover mounts 30, 32 are slidably mounted to respective first and second side walls 22, 24 of the vehicle bed 12 for vertical movement between an open or extended position (FIGS. 1–3) and a storage or retracted position (FIG. 4) with respect to the vehicle bed 12, as will be further discussed. The first and second track members 34, 36 extend transversely between the first and second cover mounts 30, 32. In the illustrated embodiment, the first and second cover mounts 30, 32 and the first and second track members 34, 36 form a support frame 44 that is vertically movable between extended and retracted positions with respect to the vehicle bed 12. The cover members 38, 40 are movably mounted to the support frame 44 for movement between the open position (FIG. 3) and a closed position (FIG. 1) with respect to the vehicle bed 12.

Specifically, each cover member 38, 40 includes first and second panels 46, 48 that are pivotably mounted to one another by hinges 47 (FIG. 3b), for example. The second panels 48 of the cover members 38, 40 are pivotably mounted to respective first and second cover mounts 30, 32 by hinges 50, for example. Further, the first panels 46 of the cover members 38, 40 include guide members 52 secured thereto. The guide members 52 of each first panel 46 are slidably mounted on respective first and second track members 34, 36. The guide members 52 may comprise rolling members such that the first panels 46 may roll along the first and second track members 34, 36. As a result, the cover members 38, 40 are moveably arranged on the support frame 44 for movement in opposing opening and closing directions along the first and second track members 34, 36, respectively.

Figure 5:
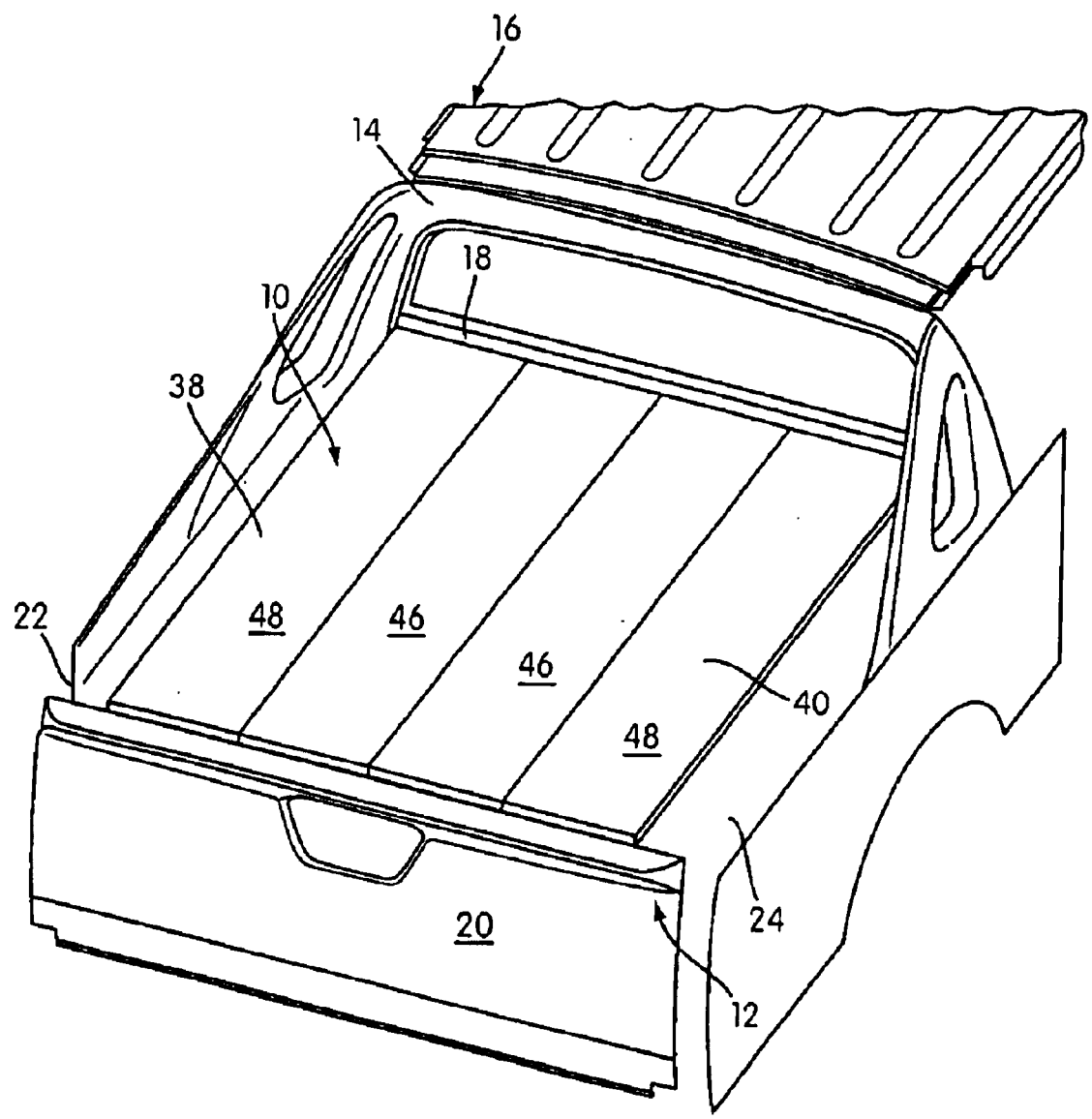
FIG. 5 is a top perspective view of the cover assembly shown in FIG. 1 with the cover members in a closed position and the cover mounts in an extended position.
Figure 6:
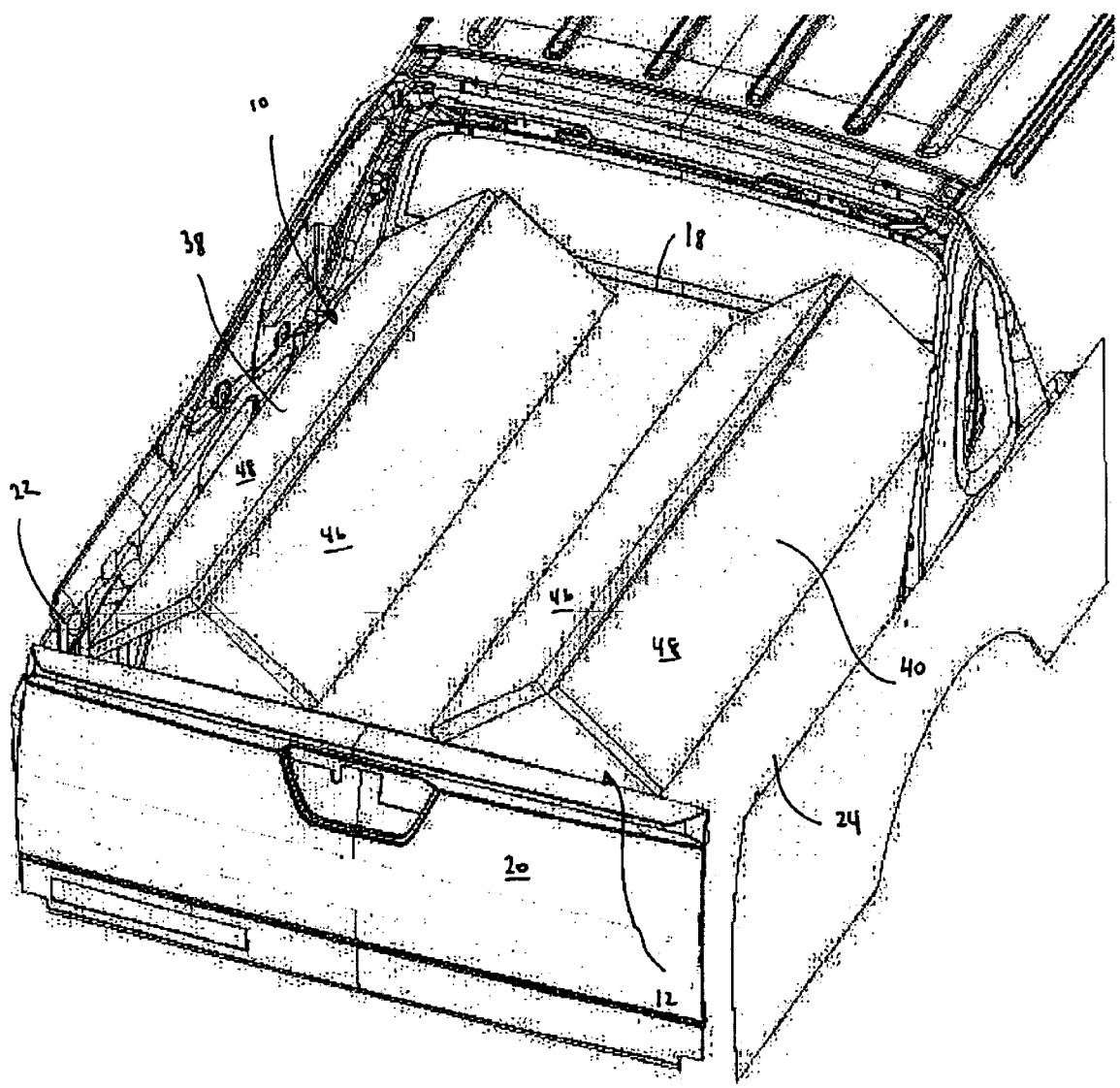
FIG. 6 is a top perspective view of the cover assembly shown in FIG. 1 with the cover members being moved to an open position and the cover mounts in an extended position.
Figure 7:
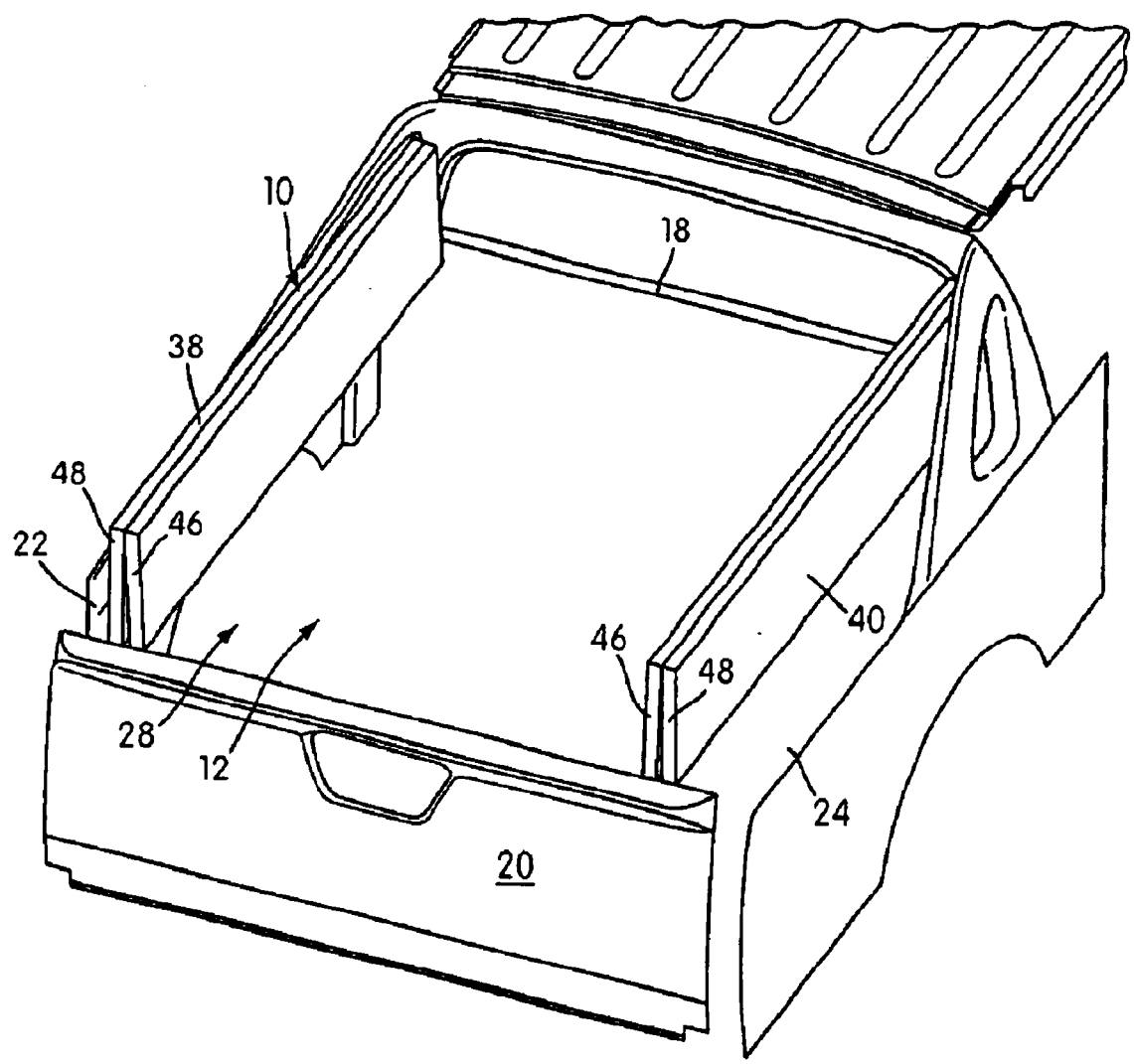
FIG. 7 is a top perspective view of the cover assembly shown in FIG. 1 with the cover members in the open position and the cover mounts in a retracted position.

Specifically, due to the pivotal connection of the first and second panels 46, 48, movement of the first panels of each cover member 38, 40 in the opening direction along the first and second track members 34, 36 towards a respective side wall 22, 24 causes the first and second panels 46, 48 of each cover member 38, 40 to fold in an accordion-like manner towards a respective side wall 22, 24 (much like a bi-fold door). That is, as the first panels 46 of each cover member 38, 40 move towards a respective side wall 22, 24, the first panels 46 pivot upwardly about the axis of the guide members 52 which pivots the second panels 48 upwardly about the axis of the hinges 50. Thus, the first panels 46 of each cover member 38, 40 push on respective second panels 48 to fold the first and second panels 46, 48 about the axis of the hinge 47, as shown in FIGS. 2 and 6. Continued movement of the first panels 46 in the opening direction moves the first panels 46 adjacent respective second panels 48 such that the first and second panels 46, 48 extend generally vertically upwardly from a respective side wall 22, 24, which is the open position of the cover members 38, 40, as shown in FIGS. 3 and 7. This uncovers the upwardly facing opening of the vehicle bed 12 and facilitates access to the interior space 28 thereof Likewise, movement of the first panels 46 of each cover member 38, 40 towards one another in the closing direction along the first and second track members 34, 36 causes the first panels 46 to pull respective second panels 48 and hence move the first and second panels 46, 48 into covering relation to the interior space 28 of the vehicle bed 12. In the closed position, the cover members 38, 40 extend between the side walls 22, 24 and engage one another to close the upwardly facing opening of the vehicle bed 12 and inhibit access to the interior space 28 thereof, as shown in FIGS. 1 and 5.

As best shown in FIG. 2, the motor assembly 42 is operatively connected to the first panels 46 of each cover member 38, 40. The motor assembly 42 is activated to selectively move the first panels 46 and hence the second panels 48 in respective opening and closing directions. Specifically, the motor assembly 42 is operable to move the cover members 38, 40 between a fully closed position wherein the cover members 38, 40 are positioned in fully covering relation with respect to the interior space 28 of the vehicle bed 12, and a fully open position wherein the cover members 38, 40 are fully collapsed to permit substantial full access to the interior space 28 of the vehicle bed 12. The motor assembly 42 may be operable to move the cover members 38, 40 to at least one intermediate position wherein the cover members 38, 40 are positioned in partial covering relation with respect to the interior space 28 of the vehicle bed 12, thereby covering a portion of the interior space 28 of a vehicle bed 12, and permitting access to another portion of the interior space 28 of the vehicle bed 12.

In the illustrated embodiment, the motor assembly 42 comprises a pair of motors 54, 56. Each motor 54, 56 is provided adjacent a respective track member 34, 36. Drive cables 58, 60 are operatively connected to respective motors 54, 56 and extend longitudinally through the respective track members 34, 36 such that the drive cables 58, 60 can be operatively connected to respective guide members 52 of the first panels 46, as best shown in FIG. 2. Thus, the motors 54, 56 drive the respective cables 58, 60 in opening and closing directions to thereby move the guide members 52 and first panels 46 connected thereto in opening and closing directions. That is, the motors 54, 56 are operative connected to the first and second cover members 38, 40 and constructed to move the cover members 38, 40 at least between the open and closed positions thereof. The motors 54, 56 may be activated by a remote control device, a manual switch, or an automatic one-touch switch proximate the vehicle bed 12 or the vehicle cab 14. The motors 54, 56 may include an electronic brake to hold the cover members 38, 40 in the open position, for example. Alternatively, the motor assembly 42 may comprise a single motor to move the cover members 38, 40 between open and closed positions.

Figure 2:
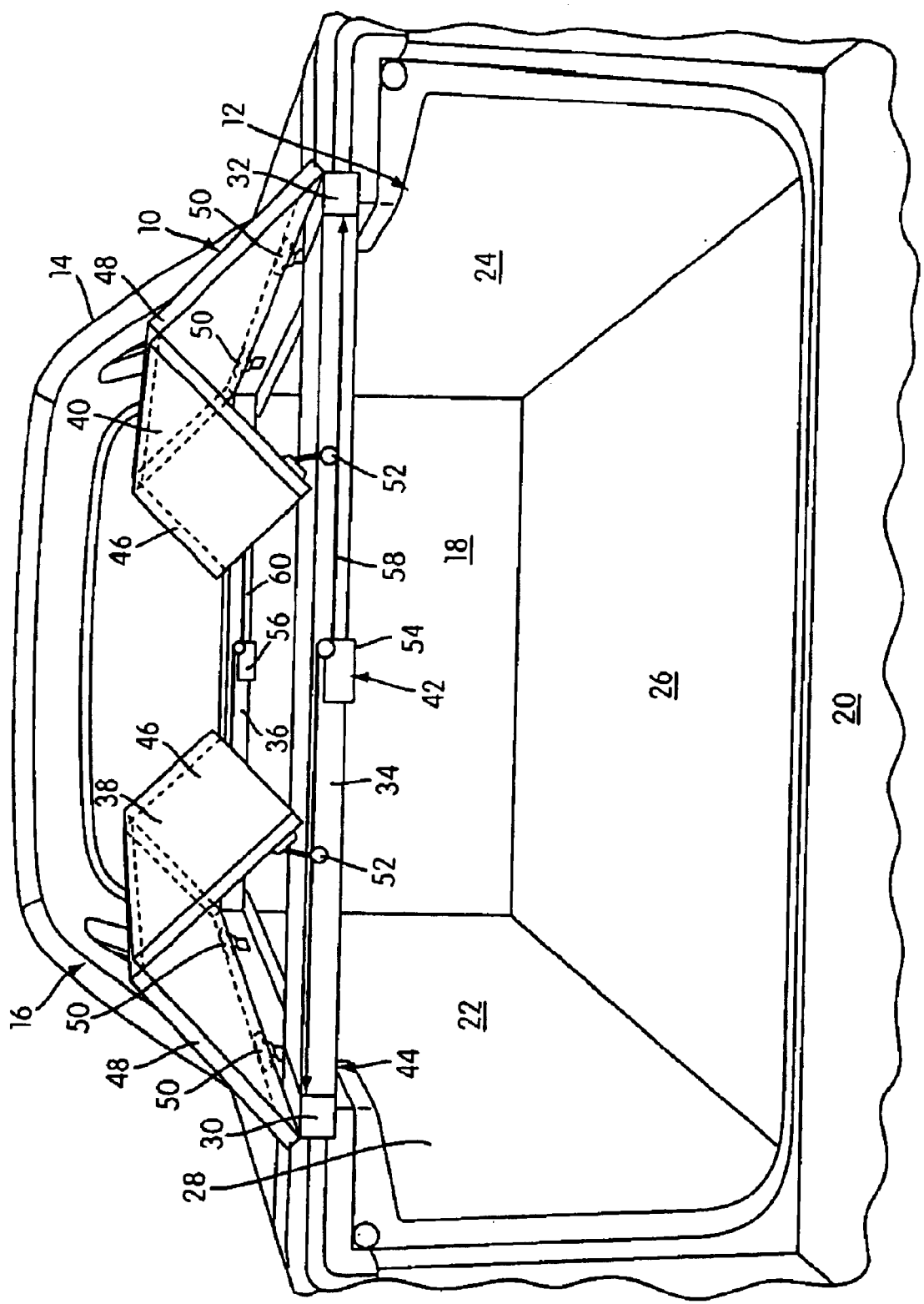
FIG. 2 is a rear perspective view of the cover assembly shown in FIG. 1 with the cover members being moved to an open position and the cover mounts in an extended position.
Figure 3:
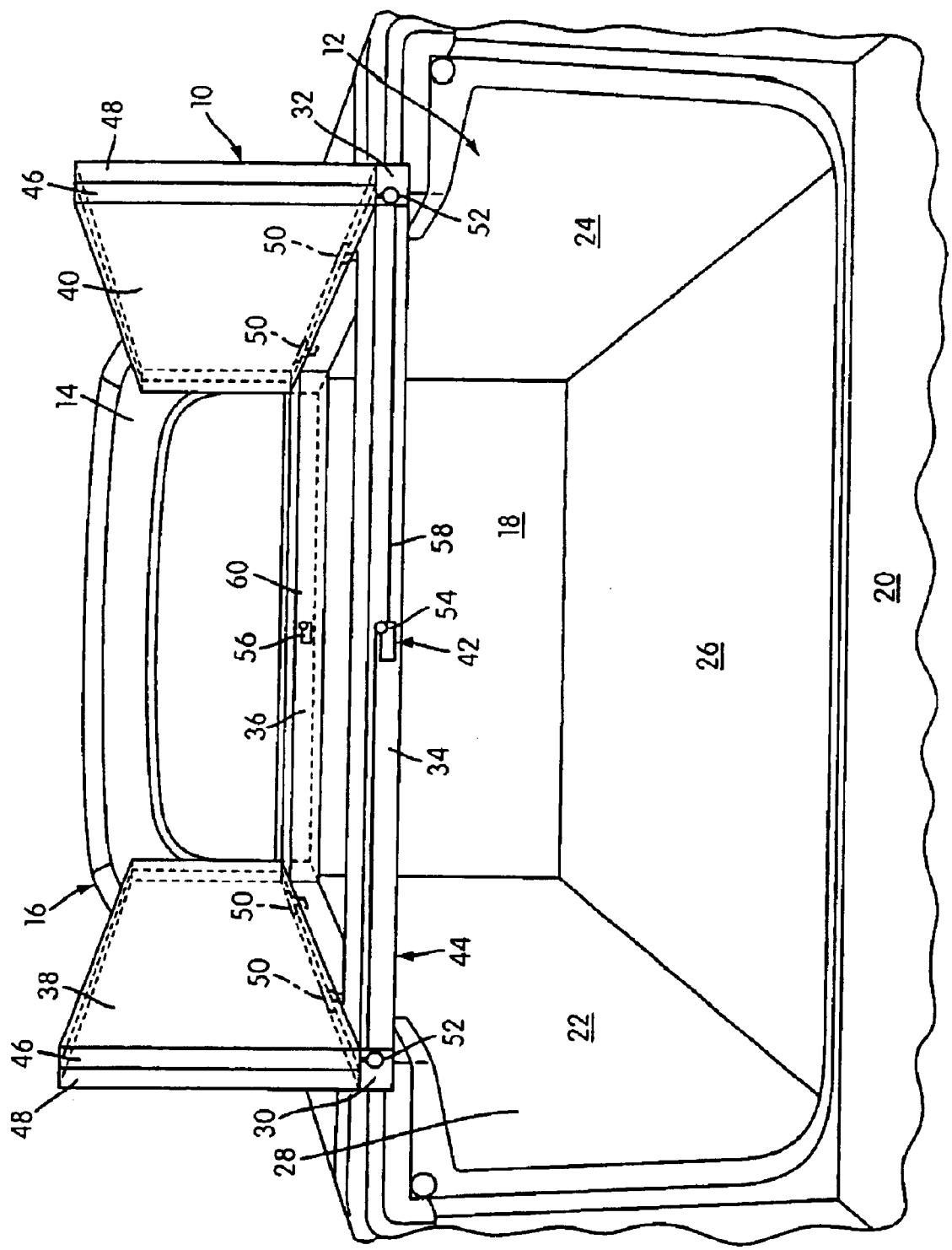
FIG. 3 is a rear perspective view of the cover assembly shown in FIG. 1 with the cover members in the open position and the cover mounts in an extended position.
Figure 4:
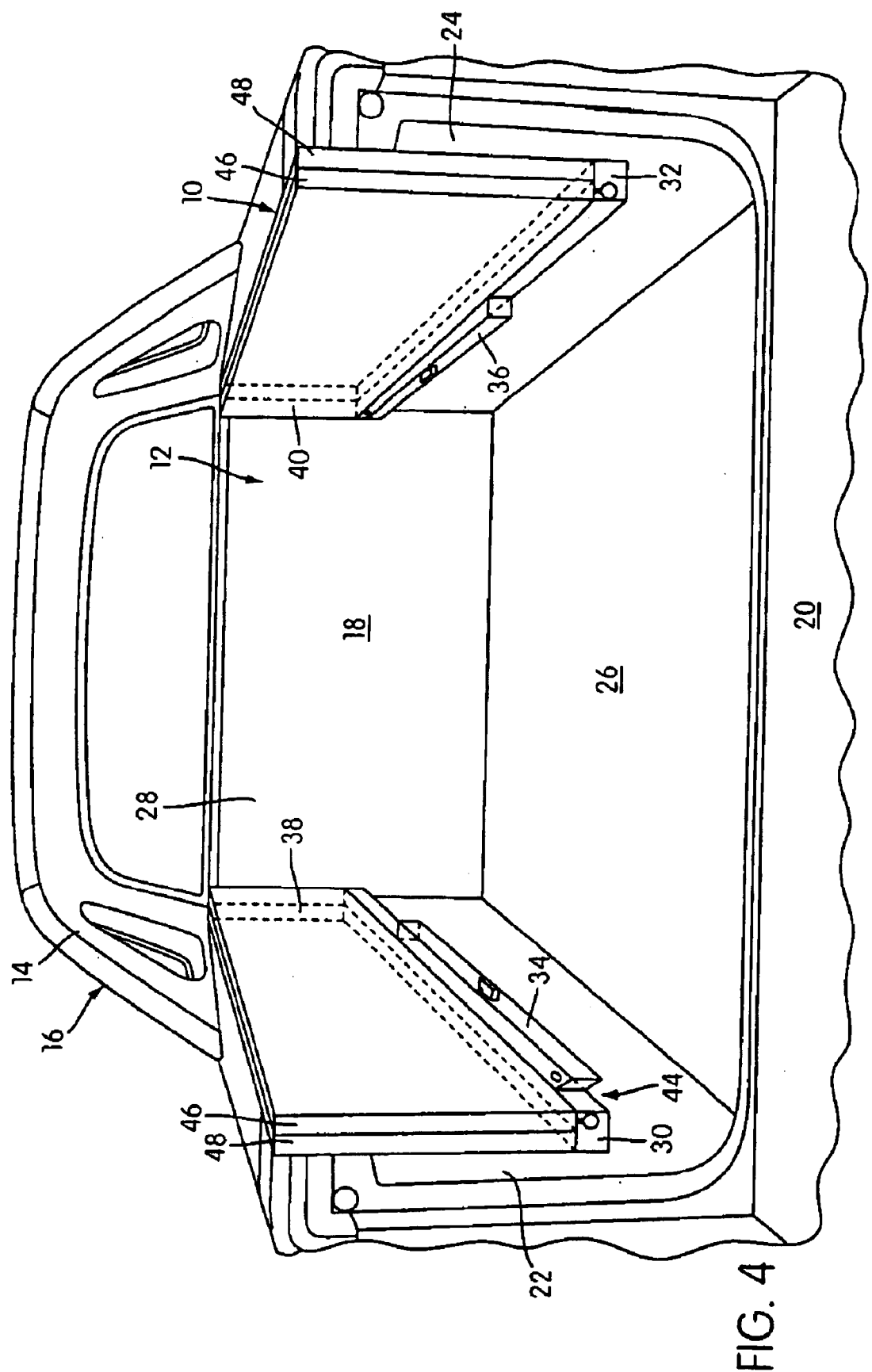
FIG. 4 is a rear perspective view of the cover assembly shown in FIG. 1 with the cover members in the open position and the cover mounts in a retracted position.
Figure 8:
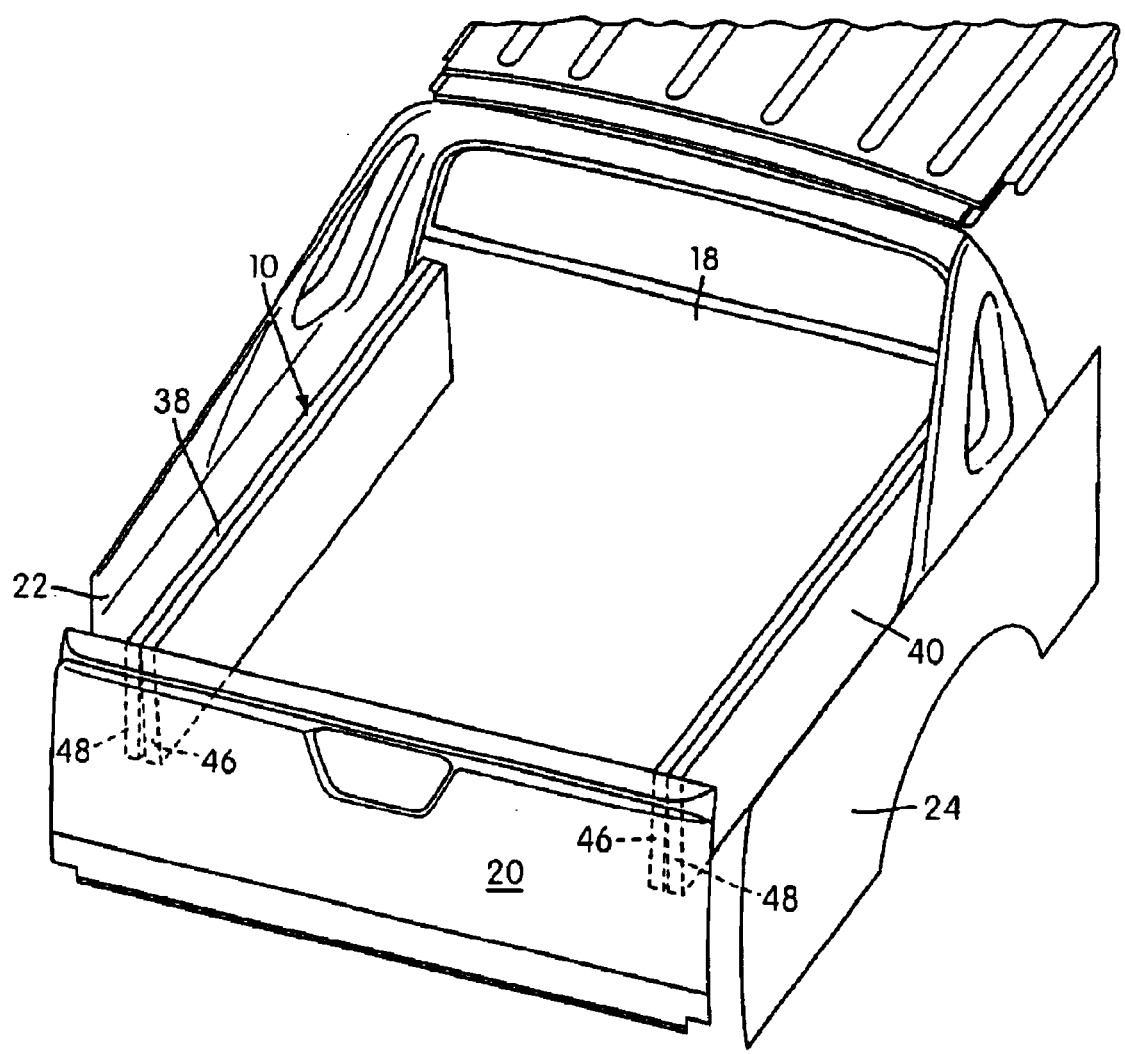
FIG. 8 is a top perspective view of the cover assembly shown in FIG. 1 with the cover members in the open position and the cover mounts in a retracted position.
Figure 9:
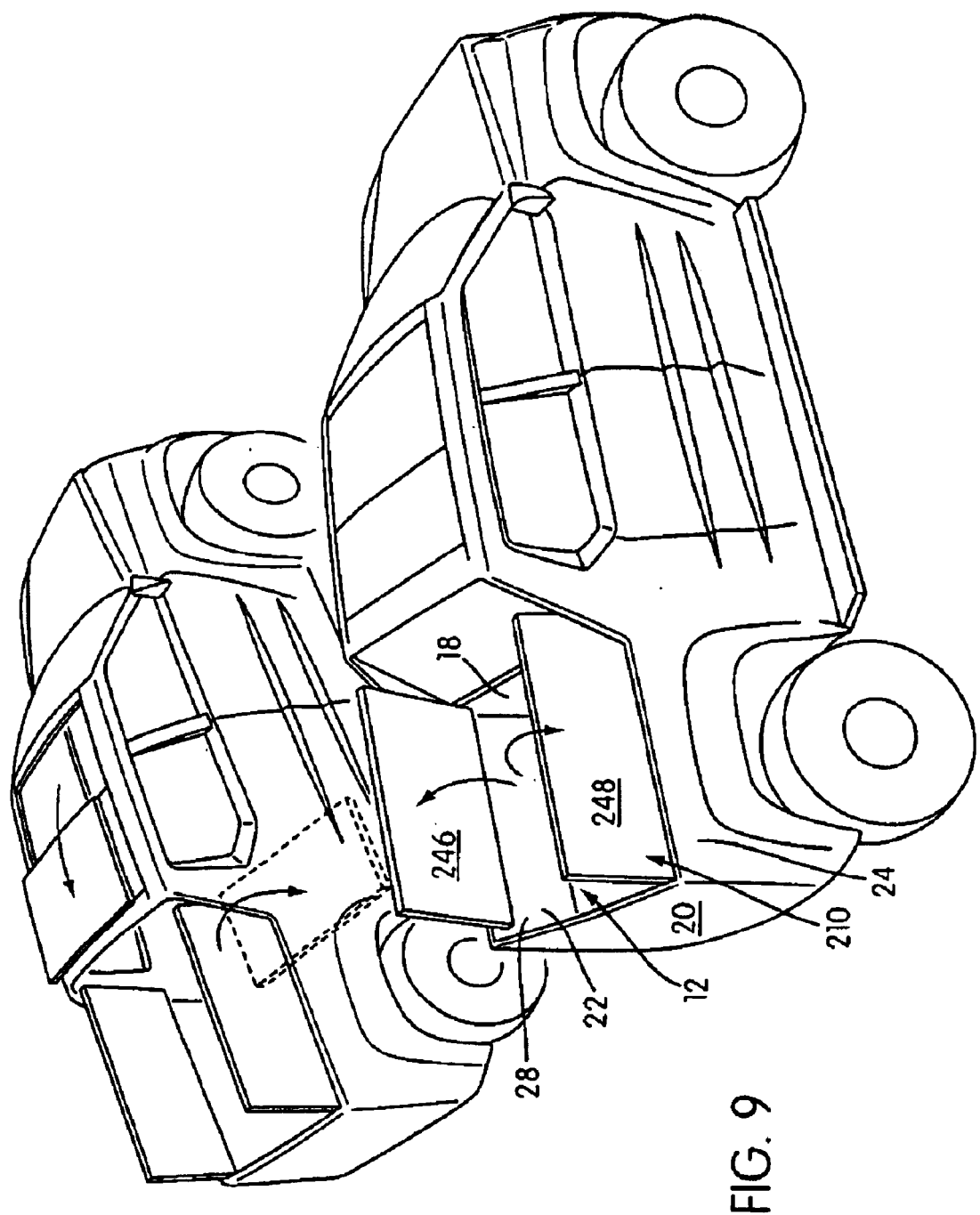
FIG. 9 is a perspective view of another embodiment of the cover assembly, the cover members of the cover assembly in an open position.

As shown in FIGS. 1–3, the support frame 44 is in the extended position, e.g., positioned vertically outwardly of the interior space 28 of the vehicle bed 12, to allow the cover members 38, 40 to be moved into and out of covering relation with respect to the interior space 28 of the vehicle bed 12. When the cover members 38, 40 are in the open position, as shown in FIG. 3, the support frame 44 may be moved vertically downwardly to the storage or retracted position, as shown in FIGS. 4 and 8, within the interior space 28 of the vehicle bed 12 to retract the upwardly extending cover members 38, 40 downwardly from the open position into generally parallel relation to the side walls 22, 24 of the vehicle bed 12. Thus, the cover members 38, 40 are positioned within the interior space 28 of the vehicle bed 12 for storage purposes. Moreover, moving the vertically upwardly extending cover members 38, 40 to a position within the interior space 28 of the vehicle bed 12 improves driver visibility.

That is, the cover members 38, 40 move within the interior space 28 of the vehicle bed 12 such that the cover members 38, 40 extend upwardly about as high as the first and second side walls 22, 24 (FIGS. 4 and 8). The cover mounts 30, 32 are slidably mounted to respective track structures that are provided on each of the side walls 22, 24 to allow movement of the support frame 44 between the extended and retracted positions. The support frame 44 may be moved manually between the extended and retracted positions or may be operatively connected to a motor that may be activated to control movement of the support frame 44.

As shown in FIG. 4, the track members 34, 36 may be movably mounted with respect to the cover mounts 30, 32 such that the track members 34, 36 may be pivoted to a position adjacent the cover mounts 30, 32 after the support frame 44 has been moved to the retracted position. As a result, the track members 34, 36 do not inhibit access to the interior space 28 of the vehicle bed 12 for loading/unloading purposes.

Figure 3B:
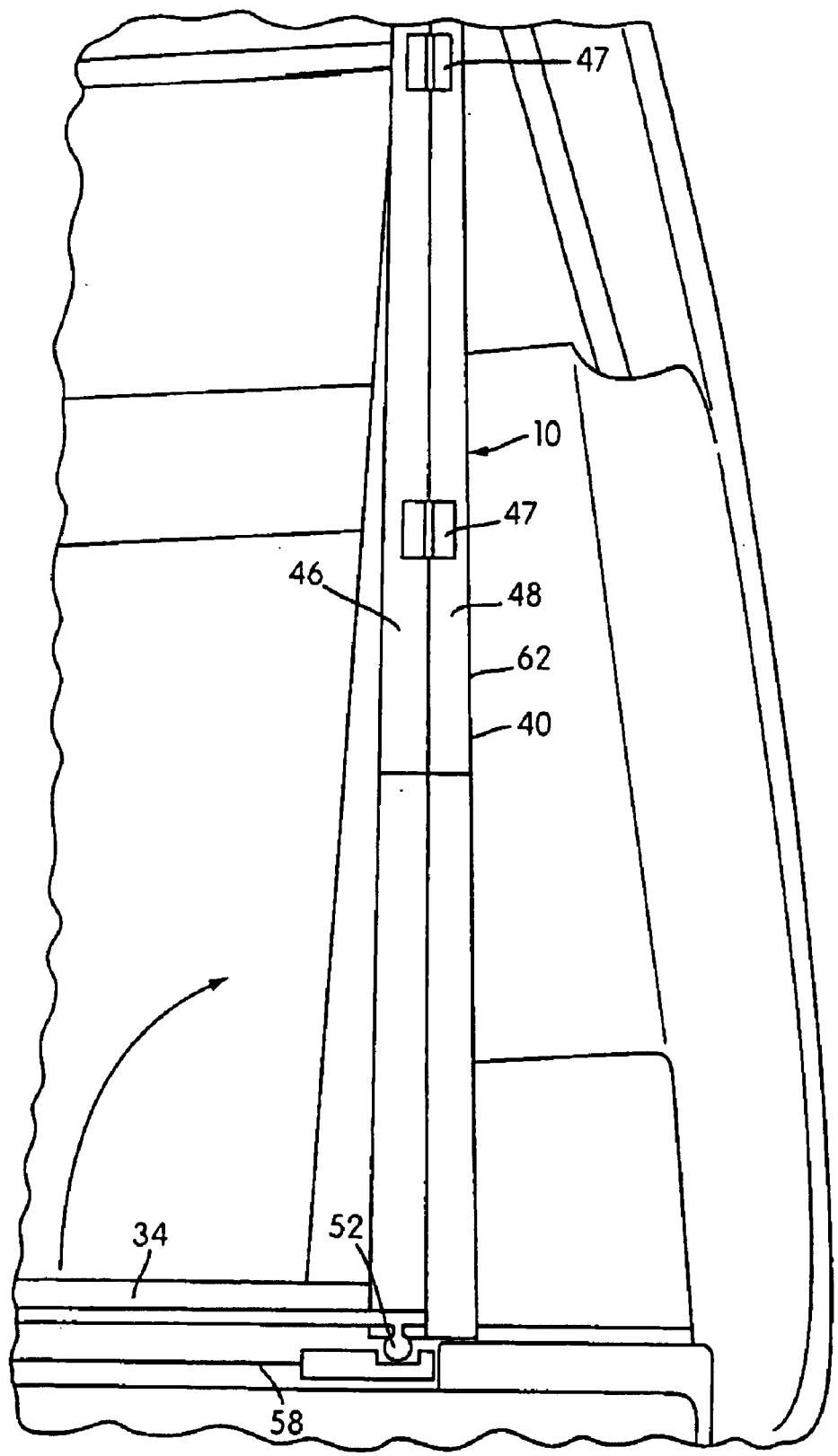
FIG. 3b is an enlarged perspective view illustrating the cover assembly shown in FIG. 3.

Weather strip seals may be positioned between the support frame 44 and the cover members 38, 40 to prevent the intrusion of foreign matter, e.g., water, into the interior space 28 of the vehicle bed 12. Also, weather strip seals may be positioned between adjacent panels of the cover members 38, 40. For example, a weather strip seal may be secured to an end of one of the first panels 46 such that the weather strip seal is positioned between the first panels 46 of respective cover members 38, 40 when the cover members 38, 40 are moved to the closed position so as to prevent water, for example, from entering the vehicle bed 12. As shown in FIG. 3b, a weather strip seal 62 extends along the edges of the first and second panels 46, 48 such that the weather strip seal 62 can be positioned between the first and second panels 46, 48 of each cover member 38, 40 when the cover members 38, 40 are moved to the closed position.

In the illustrated embodiment, the cover mounts 30, 32 are operatively connected to the track members 34, 36 to form a support frame 44 that is moveable between extended and storage positions. However, the cover mounts 30, 32 may be structured to move relative to the track members 34, 36 between extended and storage positions. In this embodiment, the track members 34, 36 would remain in an extended position. Alternatively, the cover mounts 30, 32 may be in the form of a track portion provided adjacent respective side walls 22, 24 of the vehicle bed 12 to enable the cover members 38, 40 to move between extended and storage positions. Thus, the cover mounts 30, 32 may have any suitable structure to enable the cover members 38, 40 to be moved between an open position, a closed position, and a storage or retracted position.

Figure 10:
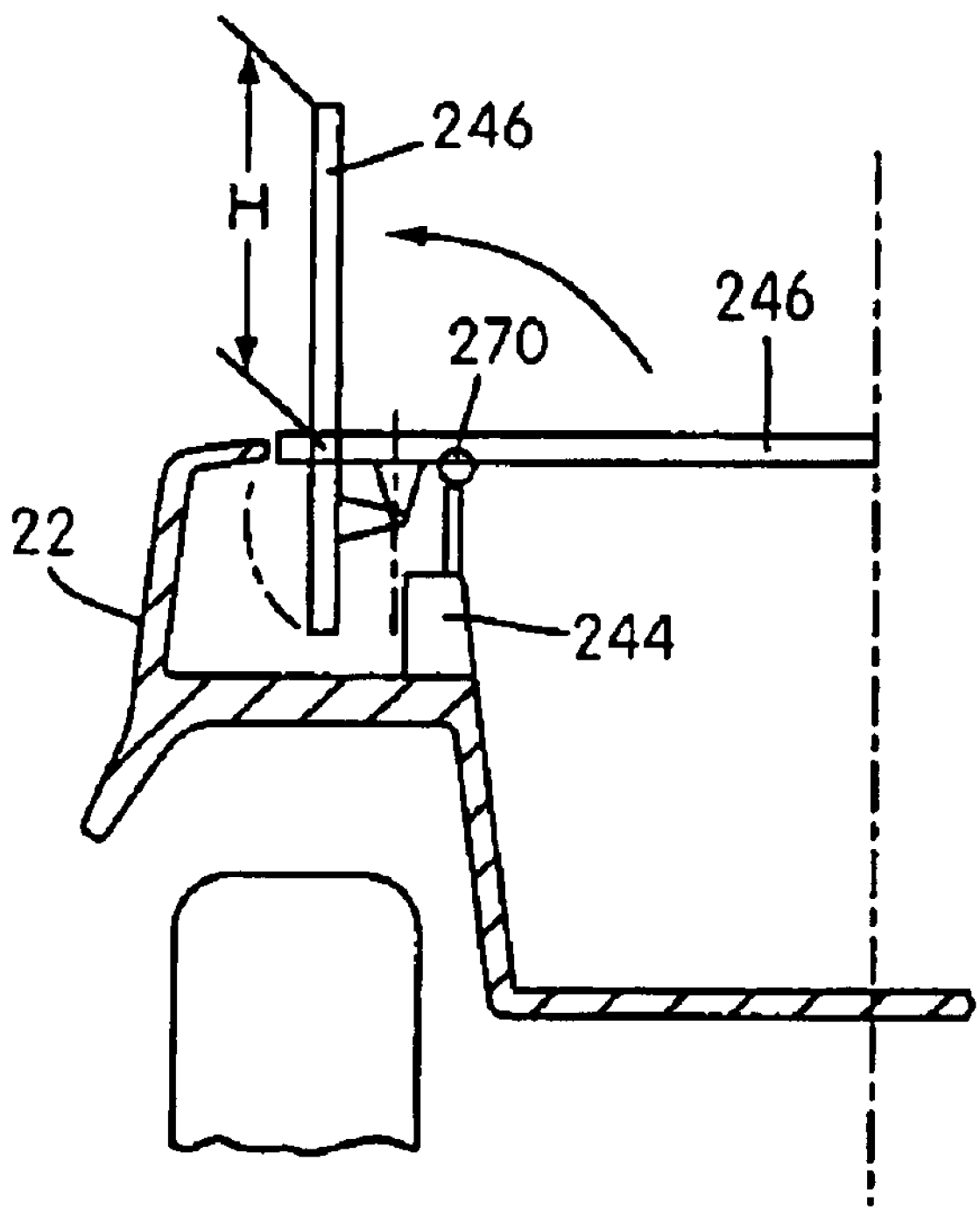
FIG. 10 is a cross-sectional view of the cover assembly of FIG. 9 illustrating a cover member being moved from a closed position to an open position.
Figure 12:
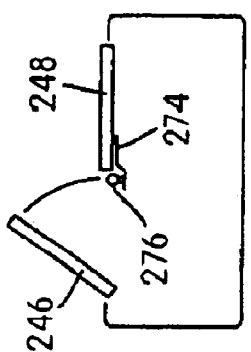
FIG. 12 is a schematic view illustrating the cover members of the cover assembly of FIG. 9.
Figure 13:
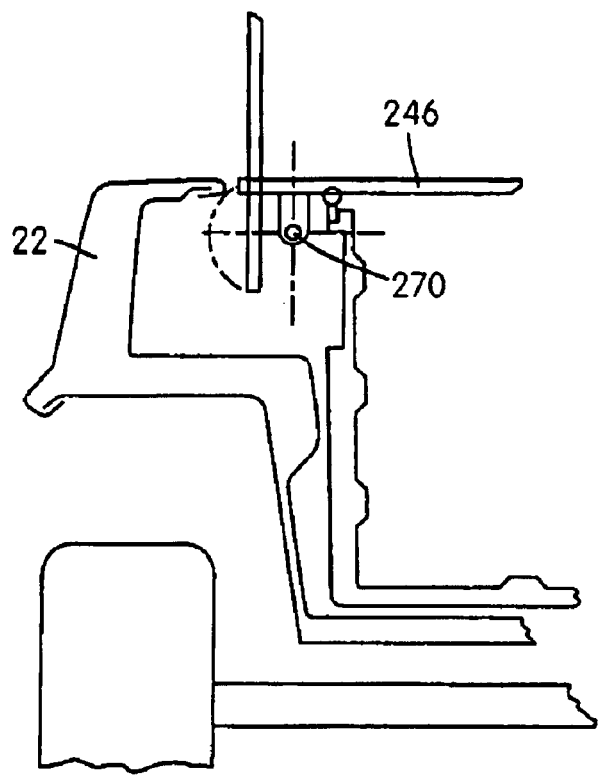
FIG. 13 is a cross-sectional view of the cover assembly of FIG. 9 illustrating the rotational axis of a cover member.
Figure 14:
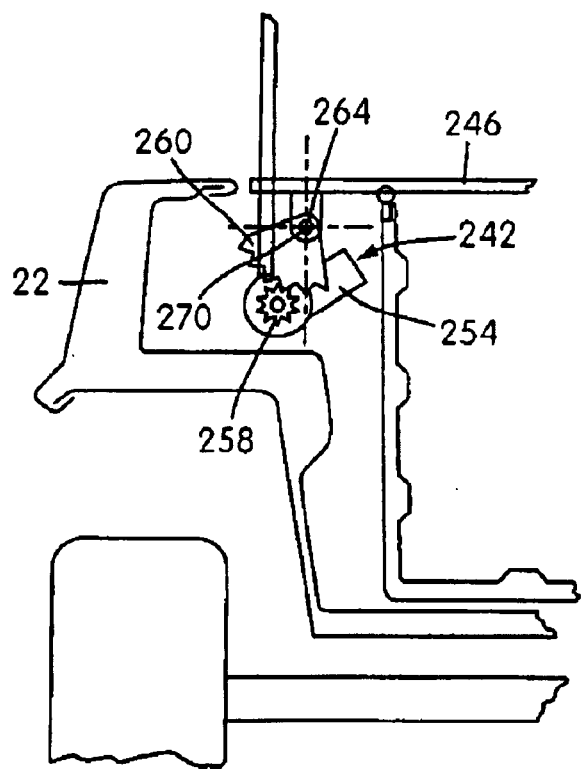
FIG. 14 is a cross-sectional view of the cover assembly of FIG. 9 illustrating the motor assembly for driving the cover members of the cover assembly between open and closed positions.

Another embodiment of a cover assembly, indicated as 210, is illustrated in FIGS. 9–15. In this embodiment, the cover assembly 210 includes cover members in the form of first and second panels 246, 248 that are pivotably mounted adjacent respective side walls 22, 24 of the vehicle bed 12 for pivotal movement between an open position (FIGS. 9 and 11) and a closed position (FIGS. 10, 13, and 14). As shown in FIG. 10, the panels 246, 248 are pivotally mounted to a respective cover mount 244 provided on the wheel well of the vehicle bed. The cover mounts 244 pivotally mount respective panels 246, 248 to the vehicle bed 12 at points substantially inwardly from lateral outer ends of the panels 246, 248, as will be further discussed. In the open position, the first and second panels 246, 248 extend generally vertically upwardly from respective side walls 22, 24 to uncover the upwardly facing opening of the vehicle bed 12 and facilitate access to the interior space 28 thereof. In the closed position, the first and second panels 246, 248 extend between the side walls 22, 24 and engage one another to close the upwardly facing opening of the vehicle bed 12 and inhibit access to the interior space 28 of the vehicle bed 12.

Figure 11:
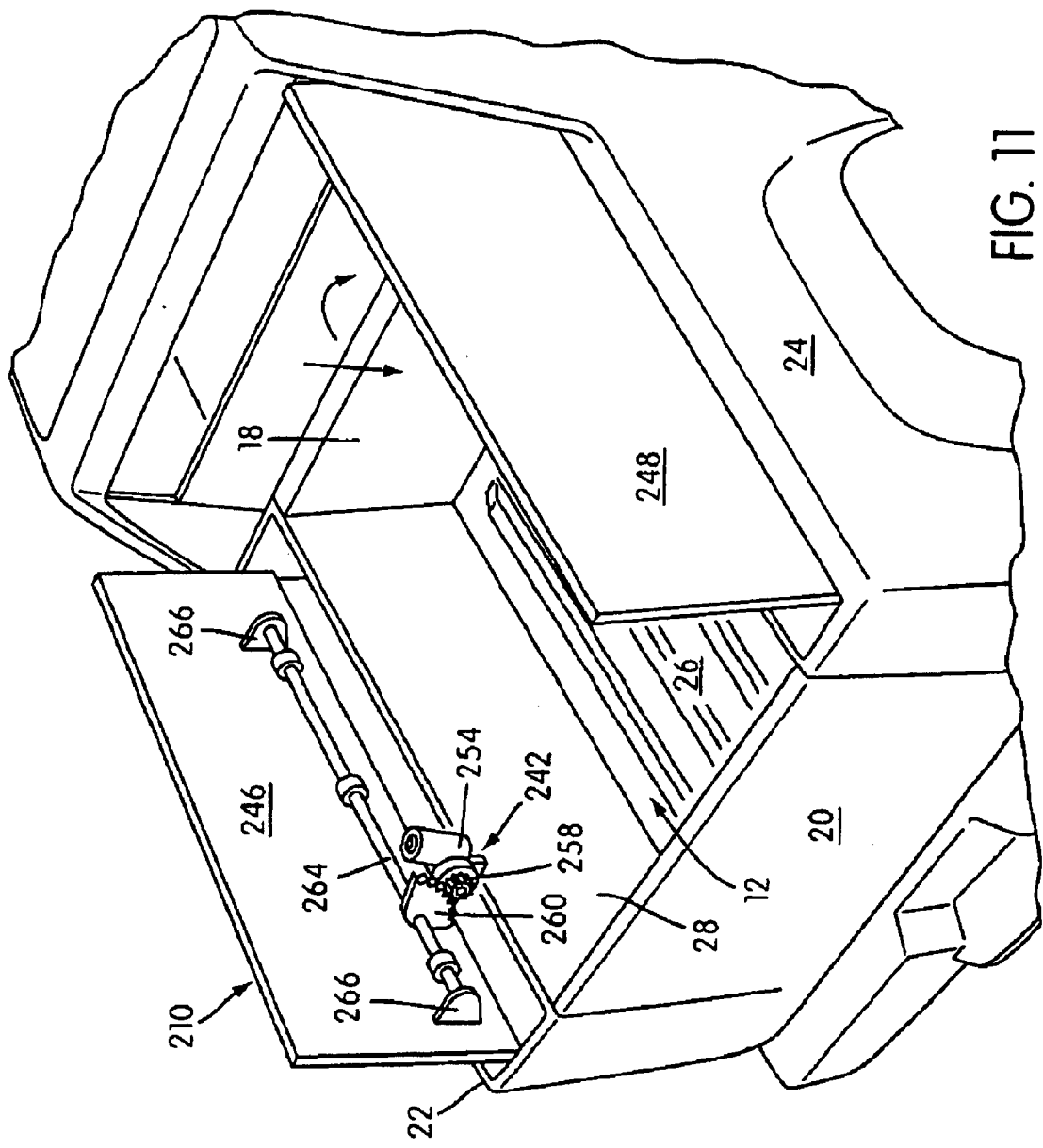
FIG. 11 is a perspective view of the cover assembly of FIG. 9 illustrating a motor assembly for driving the panels of the cover assembly between open and closed positions.
Figure 15:
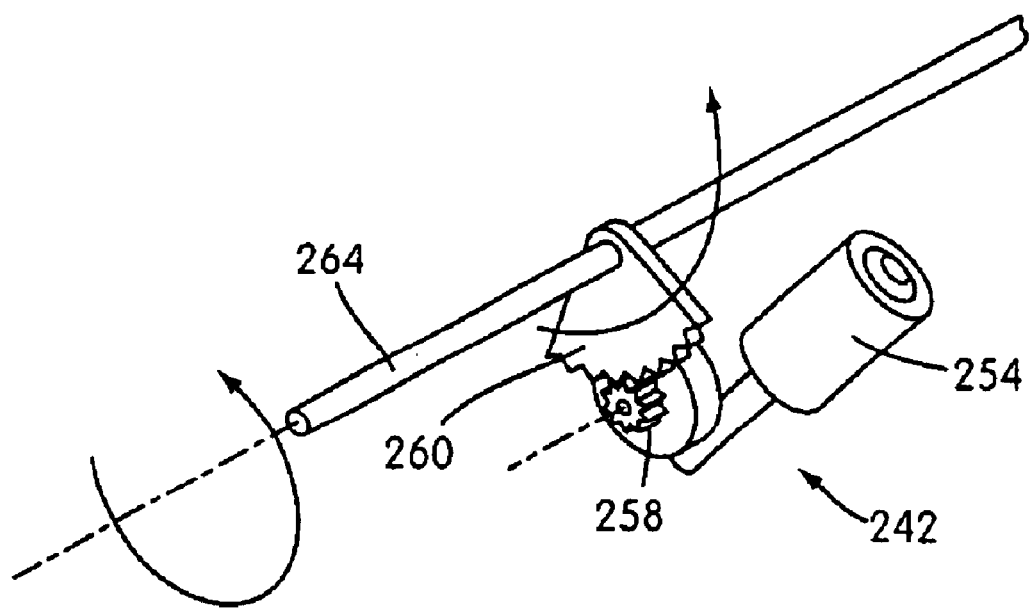
FIG. 15 is an isolated perspective view of the motor assembly shown in FIG. 11.

As shown in FIGS. 11 and 14–15, a motor assembly 242 is operable to move the first and second panels 246, 248 between the open and closed positions. In the illustrated embodiment, the motor assembly 242 comprises a pair of motors 254 (only one of the motors being visible) operatively connected to a respective panel 246, 248. Each motor 254 includes a gear 258 that engages a sector gear 260 provided on each of the panels 246, 248 to drive the panels 246, 248 between the open and closed positions. Specifically, each panel 246, 248 includes an elongated shaft 264 secured thereto by support members 266. The sector gear 260 is rigidly secured to the shaft 264 and is positioned into engagement with the gear 258 of the motor 254. As a result, rotation of the motor gear 258 causes corresponding rotation of the sector gear 260 which in turn moves the respective panel 246, 248 between open and closed positions. The motor 254 may include an electronic brake to hold the respective panel 246, 248 in the open position, for example.

As shown in FIGS. 10, 13, and 14, the rotary axis 270, e.g. the axis of the shaft 264, is positioned inwardly from the lateral outer edge of the panel 246, 248. As a result, when the panels 246, 248 are pivoted to the open position, a portion of the panel 246, 248 is positioned within the interior space 28 of the vehicle bed 12. That is, the pivotal mounting of the panels 246, 248 at the points spaced substantially inwardly of the lateral outer edges thereof enable the lateral outer portions of the panels 246, 248 to be received within the interior space 28 of the vehicle bed 12 when the panels 246, 248 are in the open position thereof. Thus, the height H of the panel 246, 248 that extends outwardly from the respective side wall 22, 24 when it is in an open position is less than the overall height of the panel 246, 248, as shown in FIG. 10. By having a portion of the panel 246, 248 positioned with the interior space 28 of the vehicle bed 12, driver visibility is increased.

Figure 16:
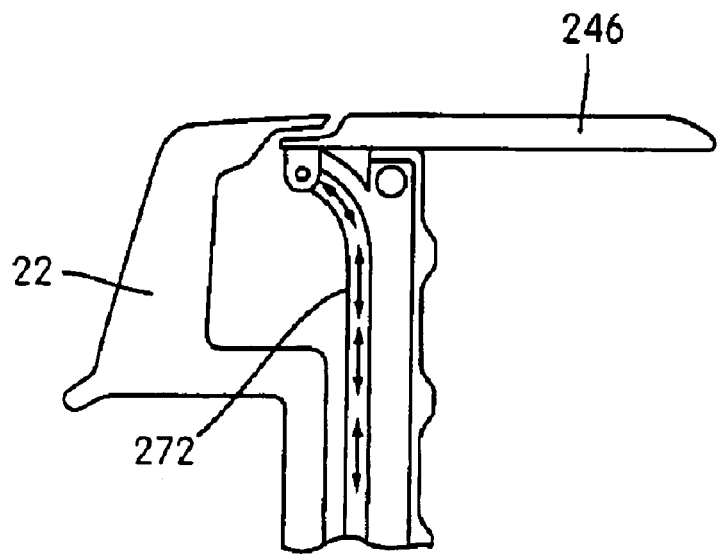
FIG. 16 is a cross-sectional view of another embodiment of the cover assembly showing a cover member of the cover assembly in a closed position.
Figure 17:
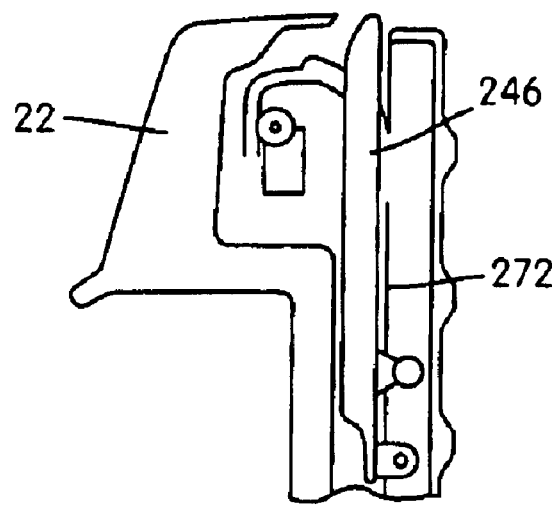
FIG. 17 is a cross-sectional view of the cover assembly shown in FIG. 16 with the cover member moved to a retracted position within the interior space of the vehicle bed.

FIGS. 16 and 17 illustrate another embodiment of the cover assembly in which the panels 246, 248 may be fully retracted into the interior space 28 of vehicle bed 12 to improve driver visibility. Specifically, the panels 246, 248 may be operatively connected to a track portion 272 provided adjacent respective side walls 22, 24 such that after the panels 246, 248 have been moved to the open position, the panels 246, 248 may be moved generally vertically inwardly along respective track portions 272 into the interior space 28 of the vehicle bed 12.

Weather strip seals may be positioned between the panels 246, 248 and the walls 18, 20, 22, 24 of the vehicle bed 12 to prevent the intrusion of foreign matter, e.g., water, into the interior space 28 of the vehicle bed 12. A weather strip seal may be secured to an end of one of the first and second panels 246, 248 such that the weather strip seal is positioned between the first and second panels 246, 248 when the panels 246, 248 are moved to the closed position so as to prevent water, for example, from entering the vehicle bed 12. As shown in FIG. 12, an extension 274 may be provided on one of the panels, e.g., the second panel 248, that is structured to support a weather strip seal 276. The other of the panels, e.g., the first panel 246, would rest on the extension 274 when the panels 246, 248 are in the closed position with the seal 276 positioned between the extension 274 and the first panel 246 to prevent the intrusion of water, for example, into the vehicle bed 12. The extension 274 may also function as a gutter to direct collected water, for example, away from the vehicle bed 12.

It can thus be appreciated that the aspects of the present invention have been fully and effectively accomplished. The foregoing specific embodiments have been provided to illustrate the structural and functional principles of the present invention, and are not intended to be limiting. To the contrary, the present invention is intended to encompass all modifications, alterations and substitutions within the spirit and scope of the detailed description.

What is claimed is:

1. A cover assembly for a vehicle bed having at least a rear wall, opposing first and second side walls extending forwardly from the rear wall, and a floor, the rear wall, the side walls, and the floor defining an interior space having an upwardly facing opening, the cover assembly comprising:

first and second cover members;

a pair of cover mounts constructed to mount the first and second cover members to the vehicle bed, the cover mounts enabling the first and second cover members to be moved between (a) a closed position wherein the cover members extend between the side walls to close the upwardly facing opening of the vehicle bed and inhibit access to the interior space thereof, (b) an open position wherein the cover members extend upwardly from the side walls to uncover the upwardly facing opening of the vehicle bed and facilitate access to the interior space thereof, and (c) a storage position wherein the cover members are retracted downwardly from the open position into the vehicle bed;

at least one motor operatively connected to the first and second cover members and constructed to move the cover members at least between the closed and open positions thereof, wherein each of the first and second cover members include first and second panels with ends pivotally mounted to one another, the second panels having an opposing end pivotally mounted to a respective cover mount and the first panels having an opposing end slidably mounted to track members to allow the cover members to move with respect to the track members between the open and closed positions.

2. A cover assembly for a vehicle bed having at least a rear wall, opposing first and second side walls extending forwardly from the rear wall, and a floor, the rear wall, the side walls, and the floor defining an interior space having an upwardly facing opening, the cover assembly comprising:

first and second cover members;

a pair of cover mounts constructed to mount the first and second cover members to the vehicle bed, the cover mounts enabling the first and second cover members to be moved between (a) a closed position wherein the cover members extend between the side walls to close the upwardly facing opening of the vehicle bed and inhibit access to the interior space thereof, (b) an open position wherein the cover members extend upwardly from the side walls to uncover the upwardly facing opening of the vehicle bed and facilitate access to the interior space thereof, and (c) a storage position wherein the cover members are retracted downwardly from the open position into the vehicle bed;

at least one motor operatively connected to the first and second cover members and constructed to move the cover members at least between the closed and open positions thereof, wherein the at least one motor includes a drive cable operatively connected to the cover members to drive the cover members between the open and closed positions.

3. A cover assembly for a vehicle bed having at least a rear wall, opposing first and second side walls extending forwardly from the rear wall, and a floor, the rear wall, the side walls, and the floor defining an interior space having an upwardly facing opening, the cover assembly comprising:

first and second cover members;

a pair of cover mounts constructed to pivotally mount the first and second cover members to the vehicle bed at points spaced substantially inwardly from lateral outer ends of the cover members, the cover mounts enabling the first and second cover members to be pivoted between (a) a closed position wherein the cover members extend between the side walls to close the upwardly facing opening of the vehicle bed and inhibit access to the interior space thereof, and (b) an open position wherein the cover members extend upwardly from the side walls to uncover the upwardly facing opening of the vehicle bed and facilitate access to the interior space thereof, the pivotal mounting of the cover members at the points spaced substantially inwardly of the lateral outer edges thereof enabling lateral outer portions of the cover members to be received within the interior space of the vehicle bed when the cover members are in the open position thereof;

at least one motor operatively connected to the first and second cover members and constructed to move the cover members at least between the closed and open positions thereof.

4. A cover assembly according to claim 3, wherein the pair of cover mounts includes track portions that extend along respective side walls that allows the first and second cover members to be movable into a position generally parallel to a respective side wall of the vehicle bed.

5. A cover assembly according to claim 3, wherein the at least one motor includes first and second motors associated with respective first and second cover members, each motor having a gear that engages a sector gear provided on each of the first and second cover members to drive the first and second cover members between the open and closed positions.

* * * * *